(12) United States Patent
Kim et al.

(10) Patent No.: US 10,047,648 B2
(45) Date of Patent: Aug. 14, 2018

(54) OIL COOLER FOR VEHICLE HAVING BYPASS VALVE OPERATED BY TEMPERATURE OF WORKING FLUID

(71) Applicants: HYUNDAI MOTOR COMPANY, Seoul (KR); INZICONTROLS CO., LTD., Siheung-si, Gyeonggi-do (KR)

(72) Inventors: Jae Yeon Kim, Hwaseong-si (KR); Joo Hyung Kim, Seoul (KR); Ji Chul Lee, Hwaseong-si (KR)

(73) Assignees: Hyundai Motor Company, Seoul (KR); Inzicontrols Co., Ltd., Siheung-si, Gyeonggi-go (KR)

( * ) Notice: Subject to any disclaimer, the term of this patent is extended or adjusted under 35 U.S.C. 154(b) by 328 days.

(21) Appl. No.: 14/864,827

(22) Filed: Sep. 24, 2015

(65) Prior Publication Data
US 2016/0146075 A1   May 26, 2016

(30) Foreign Application Priority Data
Nov. 21, 2014 (KR) .................. 10-2014-0163763

(51) Int. Cl.
G05D 23/00 (2006.01)
F01M 5/00 (2006.01)
(Continued)

(52) U.S. Cl.
CPC .......... *F01M 5/007* (2013.01); *F16H 57/0413* (2013.01); *F16K 31/002* (2013.01)

(58) Field of Classification Search
CPC ...... F01M 5/007; F01P 11/08; F16H 57/0413; F16K 31/02; F28F 2250/06
(Continued)

(56) References Cited

U.S. PATENT DOCUMENTS 6,253,837 B1 * 7/2001 Seiler .................. F16H 57/0413
 137/625.29
6,575,707 B2 * 6/2003 Matt ...................... F04B 39/06
 165/297

(Continued)

FOREIGN PATENT DOCUMENTS

JP     2000213352 A    8/2000
JP     2006207943 A    8/2006
(Continued)

*Primary Examiner* — Jason Thompson
(74) *Attorney, Agent, or Firm* — McDermott Will & Emery LLP (57) ABSTRACT

An oil cooler for a vehicle includes an inflow tank through which a working fluid flows in. An outflow tank is spaced apart from the inflow tank by a predetermined interval and has a discharge hole at one side which faces the inflow tank. A plurality of tubes connect the inflow tank with the outflow tank longitudinally such that the working fluid flows therethrough. A bypass valve is integrally mounted at an outer side of the one end portion of the inflow tank and connected to an inner side of the inflow tank to bypass or flow the working fluid flowed therein into the inflow tank by selectively opening and closing according to a temperature of the working fluid. An outflow pipe has one end mounted to the discharge hole and another end thereof mounted to the bypass valve to connect the outflow tank with the bypass valve.

17 Claims, 9 Drawing Sheets

(51) Int. Cl.
*F16K 31/00* (2006.01)
*F16H 57/04* (2010.01)

(58) Field of Classification Search
USPC ............. 137/468, 625.49; 165/297, 283, 174
See application file for complete search history.

(56) References Cited

U.S. PATENT DOCUMENTS

| | | | |
|---|---|---|---|
| 6,962,295 B2* | 11/2005 | Ieda | F16H 57/0413 137/334 |
| 2005/0056402 A1* | 3/2005 | Han | F28D 1/05366 165/103 |
| 2006/0076129 A1* | 4/2006 | Eliades | F28F 27/02 165/297 |
| 2011/0005741 A1 | 1/2011 | Sheppard | |
| 2012/0125594 A1 | 5/2012 | Elder | |
| 2013/0126149 A1* | 5/2013 | Kim | F01P 3/18 165/297 |
| 2013/0160972 A1* | 6/2013 | Sheppard | F28F 27/00 165/96 |

FOREIGN PATENT DOCUMENTS

| | | |
|---|---|---|
| KR | 20-0121360 | 4/1998 |
| KR | 20120039008 A | 4/2012 |
| KR | 20130065174 A | 6/2013 |
| KR | 20130102790 A | 9/2013 |
| KR | 20140072735 A | 6/2014 |

* cited by examiner

OIL COOLER FOR VEHICLE HAVING BYPASS VALVE OPERATED BY TEMPERATURE OF WORKING FLUID

CROSS-REFERENCE TO RELATED APPLICATION

This application claims the benefit of priority to Korean Patent Application No. 10-2014-0163763 filed in the Korean Intellectual Property Office on Nov. 21, 2014, the entire content of which is incorporated herein by reference.

TECHNICAL FIELD

The present disclosure relates to an oil cooler for a vehicle. More particularly, the present disclosure relates to an oil cooler for a vehicle having a bypass valve, which is integrally operated according to temperature of working fluid, to simplify vehicle mounting and piping layout.

BACKGROUND

An oil cooler for cooling transmission oil maintains a temperature of the transmission oil at a predetermined temperature to prevent from excessively increasing due to slip of transmission friction components. Further, the oil cooler maintains fuel consumption even when friction loss increases as oil viscosity increases by excessive cooling of the transmission oil. Such a conventional oil cooler can be classified into an air cooled oil cooler and a water cooled oil cooler.

The air cooled oil cooler includes an oil cooler installed at a front side of a radiator through which outside air smoothly flows. A bypass valve is installed in a pipe connected to a transmission and opens/closes depending on a temperature of a transmission oil.

The bypass valve maintains the transmission oil at a predetermined temperature, such that when the temperature of the transmission oil is higher than the predetermined temperature, the transmission oil flows through the oil cooler via the bypass valve. When the temperature of the transmission oil is lower than the predetermined temperature, the transmission oil cannot pass through the oil cooler, thereby flowing back into the transmission.

However, since the conventional oil cooler has the bypass valve that is connected to the transmission to open/close depending on the temperature of the transmission oil as described above, and is installed in a pipe that connects the transmission and the oil cooler, a piping layout is complicated due to a relatively large bypass valve in the pipe, thus degrading spatial utility of an engine compartment.

Further, with the bypass valve applied to the conventional oil cooler as described above, since each of constituent elements needs to be sequentially fitted and assembled to a valve mounting hole of a valve housing, it is difficult to precisely install each of the constituent elements, excessive assembling time is required, and manufacturing cost increases.

In addition, when the transmission oil does not need to be cooled, since some of the low-temperature transmission oil cooled in the oil cooler flows into the bypass valve from a transmission and then flows back into the transmission, rapid warming of the transmission oil is difficult due to a high-temperature bypassed transmission oil.

The above information disclosed in this Background section is only for enhancement of understanding of the background of the invention, and therefore, it may contain information that does not form the prior art that is already known in this country to a person of ordinary skill in the art.

SUMMARY

The present disclosure provides an oil cooler for a vehicle capable of improving vehicle mountability and simplifying a piping layout, and improving spatial utility of an engine compartment by having a bypass valve which operates according to temperature of a working fluid.

According to an exemplary embodiment of the present inventive concept, an oil cooler for a vehicle includes an inflow tank through which a working fluid flows in. An outflow tank is spaced apart from the inflow tank by a predetermined interval and have a discharge hole at one side which faces the inflow tank. A plurality of tubes connect the inflow tank with the outflow tank such that the working fluid flows therethrough. A bypass valve is integrally mounted to an outer side of the one end portion of the inflow tank and connected to an inner side of the inflow tank to bypass or flow the working fluid flowed therein into the inflow tank by selectively opening and closing according to a temperature of the working fluid. An outflow pipe has one end mounted to the discharge hole and another end mounted to the bypass valve to connect the outflow tank with the bypass valve such that the working fluid inside the outflow tank flows out via the bypass valve according to the operation of the bypass valve. The inflow tank and the outflow tank may have the plurality of tubes therebetween and are fixed by a side plate which connects both ends of the inflow tank with both ends of the outflow tank in a state of being disposed apart from each other. The inflow tank may have a length shorter than that of the outflow tank. The outflow pipe may have a cylindrical shape and may be connected to the bypass valve such that the other end thereof contacts the one end of the inflow tank. The working fluid may be transmission oil introduced from a transmission.

The bypass valve may include a valve housing integrally mounted at the outer side of the one end of the inflow tank and protruding from the one end of the inflow tank. A control unit is disposed inside the valve housing and controls the working fluid to flow into the inflow tank or to bypass by performing expansion or contraction according to the temperature of the inflowed working fluid.

The valve housing may include a first inflow hole formed at one side thereof, which is the opposite side of the inflow tank, to mount an inflow port thereto. A bypass hole is formed in another side thereof which is spaced apart from the first inflow hole to mount a bypass port thereto. A second inflow hole faces the first inflow hole at one surface which contacts the inflow tank and communicates with the inside of the inflow tank. A connecting hole is spaced apart from the second inflow hole at the part which protrudes from the one end of the inflow tank such that the other end of the outflow pipe is connected thereto.

The valve housing has a mounting space where the first and second inflow holes, the bypass hole, and the connecting hole communicate therewith. The control unit may include a sliding member of which one end is open and a mounting part is formed at a center of the other end, at least one first opening hole is formed on one side corresponding to the first inflow hole and the bypass hole along the length direction, and at least one second opening hole is formed on the other side corresponding to the second inflow hole and the connecting hole along the length direction, and which is inserted to be slidable inside the valve housing. An end cap is fixed to a mounting hole, which is formed at the valve housing to insert the sliding member into the mounting hole, to close the mounting hole and to form a fixing groove at the center thereof. A fixing rod has one end fixed to the fixing groove. A deformable member is inserted into the sliding member and moves forwardly or backwardly on the fixing rod by extending or contracting, respectively, according to the temperature of the working fluid to move the sliding member selectively forward and backward. A first elastic member is interposed between the valve housing and the sliding member and compressed or pulled to provide elastic force when the sliding member moves. The at least one first opening hole and the at least one second opening hole may be formed at an upper side and a lower side of the sliding member, respectively. The first opening hole at the upper side has an area greater than that of the second opening hole at the upper side.

When the deformable member is at its initial position, the first opening hole at the upper and and lower sides communicates with the first inflow hole and the bypass hole, respectively, and the second opening hole formed at the upper side is disposed below the second inflow hole, and the second opening hole positioned at the lower side communicates with the connecting hole. When the deformable member is deformed, the fixing rod ascends and maintains the bypass hole and the connection hole in an open state, and the first and second opening holes formed at the upper side communicate with the first and second inflow holes. The sliding member and the deformable member may be fixedly connected through a fixing ring which is mounted between the mounting part and the deformable member below the deformable member. A seal ring may prevent the working fluid flowing into the valve housing from leaking out from the valve housing and may be mounted between the valve housing and the end cap. The end cap may be fixed to the valve housing through a mounting ring that is fixedly mounted to an inner circumferential surface of mounting hole.

The mounting ring may be fixedly mounted in a ring groove formed along the inner circumferential surface of the mounting hole.

The sliding member may have at least one relief hole that is spaced apart from the mounting part at the other end in which the mounting part is formed, and is spaced apart from each other at a predetermined angle along a circumferential direction around the mounting part.

A pressure control unit may be disposed between the sliding member and the deformable member and selectively open and close the relief hole when a differential pressure occurs by the working fluid flowing inside the valve housing. The pressure control unit may include an opening and closing member that is disposed inside the other end of the sliding member to correspond to the relief hole. A second elastic member is interposed between the opening and closing member and the deformable member inside the sliding member, and applies elastic force to the opening and closing member.

The opening and closing member may have a protrusion that protrudes toward the second elastic member from the inner circumferential surface of the penetration hole.

In accordance with an oil cooler for a vehicle according to an exemplary embodiment of the present inventive concept, by having a bypass valve which is operated according to temperature of working fluids, spatial utility of an engine compartment is improved.

Furthermore, by controlling flow stream of the working fluid to allow the working fluid to bypass or flow into the oil cooler, while rapidly expanding or contracting depending on the temperature of the working fluid through a bypass valve, convenient manufacturing and assembling are achieved with a simple oil cooler structure, and manufacturing cost is reduced through simplification of constituent elements.

In addition, during bypass of the working fluid, a required power of a hydraulic pump can be reduced through an increase of flow rate. The maintenance costs are reduced and convenience of replacement work is improved by assembling the internal constituent elements to a valve housing later since internal components can be replaced after breakdown.

Further, a flow rate can be increased by securing a bypass flow passage compared to the related art and by preventing the transmission oil from leaking to a transmission in advance.

Reliability of flow stream control according to the temperature of the transmission oil can be secured, and the overall fuel consumption efficiency of a vehicle is improved by reducing friction loss inside the transmission through rapid warming of the transmission oil.

DETAILED DESCRIPTION OF THE EMBODIMENTS

An exemplary embodiment of the present inventive concept will hereinafter be described in detail with reference to the accompanying drawings.

Since exemplary embodiments described in the specification and the configurations shown in the drawings are merely the exemplary embodiments and configurations of the present inventive concept, they do not represent all of the technical ideas of the present disclosure, and it should be understood that that various equivalents and modified examples, which may replace the exemplary embodiments, are possible when filing the present application.

In order to clearly describe the present disclosure, parts irrelevant to the description are omitted, and identical or similar constituent elements throughout the specification are denoted by the same reference numerals.

Since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit," " . . . means," " . . . part," and " . . . member" described in the specification mean a unit of a comprehensive configuration having at least one function or operation.

Figure 1:
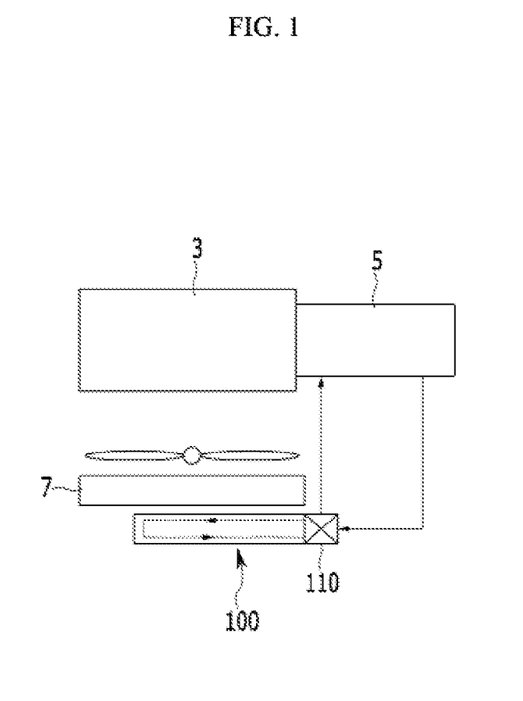
FIG. 1 is a block diagram of a transmission oil cooling system to which an oil cooler for a vehicle according to an exemplary embodiment of the present inventive concept is applied.
Figure 2:
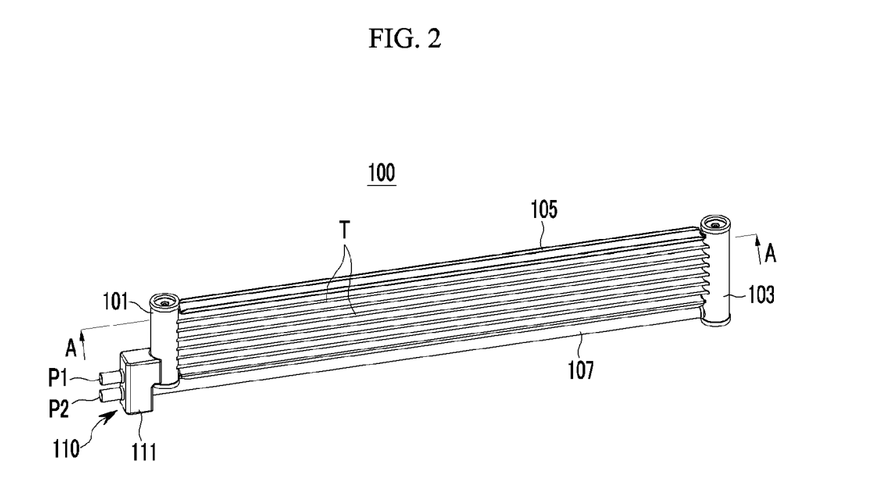
FIG. 2 is a front view of the oil cooler for a vehicle according to an exemplary embodiment of the present inventive concept.
Figure 3:
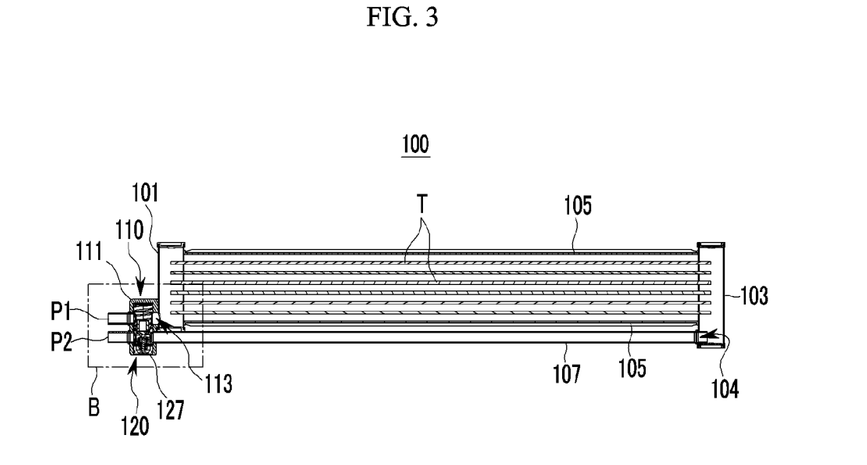
FIG. 3 is a cross-sectional view taken along the line A-A of FIG. 2.
Figure 4:
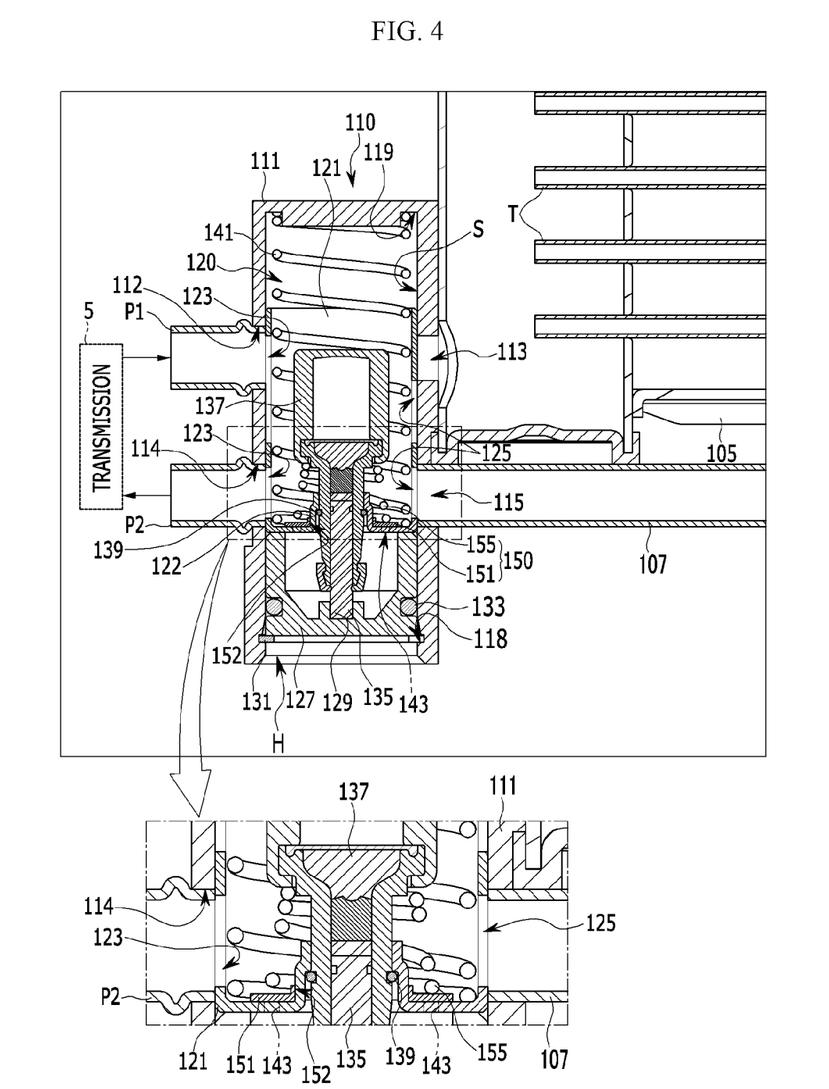
FIG. 4 is an enlarged view of the section B of FIG. 3.

FIG. 1 is a block diagram of a transmission oil cooling system having an oil cooler for a vehicle according to an exemplary embodiment of the present inventive concept, FIG. 2 is a front view of the oil cooler for a vehicle according to the exemplary embodiment of the present inventive concept, FIG. 3 is a cross-sectional view taken along the line A-A of FIG. 2, and FIG. 4 is an enlarged view of the section B of FIG. 3.

An oil cooler 100 for a vehicle according to an exemplary embodiment of the present inventive concept has a working fluid passing through therein or bypassing depending on a temperature of the working fluid. Therefore, the oil cooler 100 cools the working fluid by exchanging heat with outdoor air introduced from outside, as an air cooled oil cooler.

Here, the working fluid may be a transmission oil introduced from a transmission 5.

That is, in the present disclosure, the oil cooler 100 is, as shown in FIG. 1, has a bypass valve 110 integrally connected thereto. The oil cooler 100 is connected to the transmission 5 mounted on one side of an engine 3 through the bypass valve 110.

The oil cooler 100 is disposed in front of a radiator 7 and heat-exchanges with the outside air. The bypass valve 110 allows the transmission oil to rapidly bypass or flow into the oil cooler 100 depending on the temperature of the transmission oil introduced from the transmission 5.

As shown in FIGS. 2 and 3, the oil cooler 100 includes an inflow tank 101, an outflow tank 103, a plurality of tubes (T), the bypass valve 110, and an outflow pipe 107.

The transmission oil flows via the bypass valve 110 into the inflow tank 101.

In the present disclosure, the outflow tank 103, which is spaced apart from the inflow tank 101, has a discharge hole 104 at an interior surface which faces the inflow tank 101.

In the present disclosure, the plurality of tubes T are installed longitudinally to connect the inflow tank 101 with the outflow tank 103 such that the transmission oil flows therethrough.

The inflow tank 101 and the outflow tank 103 may be fixed by a side plate 105 which connects both ends of the inflow tank 101 with both ends of the outflow tank 103, respectively.

The inflow tank 101 may have a length shorter than that of the outflow tank 103. Accordingly, the outflow tank 103 has a lower portion extending downwards further than a lower portion of the inflow tank 101, at which the discharge hole 104 is formed.

In the present disclosure, the bypass valve 110, which is integrally mounted to an outside of the inflow tank 101, is connected to an inner side of the inflow tank 101 and selectively opens and closes so as to bypass the transmission oil or flow the transmission oil into the inflow tank 101.

The bypass valve 110 will be described below in more detail.

The outflow pipe 107 has one end connected to the discharge hole 104, and another end connected to the bypass valve 110 so as to connect the outflow tank 103 with the bypass valve 110 such that the transmission oil inside the outflow tank 103 flows out through the bypass valve 110 according to the operation of the bypass valve 110.

The outflow pipe 107 has a cylindrical shape and is connected to the bypass valve 110 such that the other end of the outflow pipe 107 is in contact with one end of the inflow tank 101.

Figure 5:
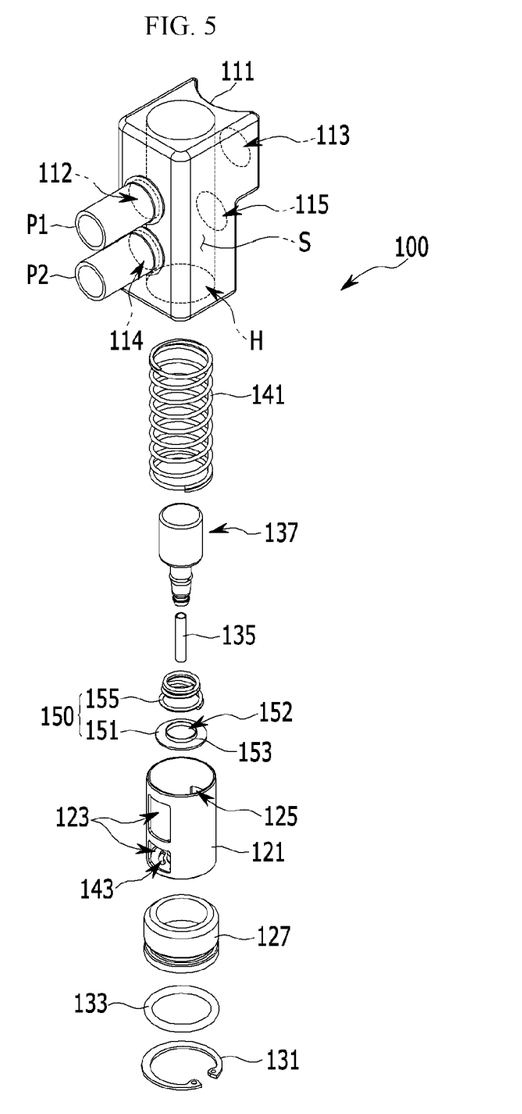
FIG. 5 is an exploded perspective view showing a bypass valve of the oil cooler for a vehicle according to an exemplary embodiment of the present inventive concept.

Referring to FIGS. 4 and 5, the bypass valve 110 includes a valve housing 111 and a control unit 120.

In the present disclosure, the valve housing 111 integrally mounted at an outer side of the one end of the inflow tank 101 and protrudes downward at the lower portion of the inflow tank 101.

The valve housing 111 may have a first inflow hole 112 formed at one side thereof, away from the inflow tank 101, in which an inflow port P1 is installed, and a bypass hole 114 formed below the first inflow hole 112, in which a bypass port P2 is installed.

The valve housing 111 may further have a second inflow hole 113 at the opposite side of the first inflow hole 112 and communicates with the inner side of the inflow tank 101. A connecting hole 115 is formed below the second inflow hole 112 at the one end of the inflow tank 101 such that the other end of the outflow pipe 107 is connected thereto.

The inflow port P1 of the valve housing 111 is mounted at the first inflow hole 112 which is formed at an upper portion of the valve housing 111.

The bypass hole 114 is formed at a lower portion of the valve housing 111. In addition, the bypass port P2 is mounted at the bypass hole 114 which corresponds to the outflow pipe 107 to communicate with the transmission 5.

The valve housing 111 may have a mounting space S therein. The mounting space S communicates with the first and second inflow holes 112 and 113, the bypass hole 114, and the connecting hole 115, such that the transmission oil flows into or discharges from the transmission 5 or the inflow tank 101.

In the present disclosure, the first inflow hole 112 may face the second inflow hole 113 at the opposite sides of the upper portion of the valve housing 111, and the bypass hole 114 may face the connecting hole 115 at the opposite sides of a lower portion of the valve housing 111.

The control unit 120 is installed in the mounting space S of the valve housing 111 to flow the transmission oil into the inflow tank 101 or bypass it by performing expansion or contraction according to the temperature of the transmission oil introduced from the transmission 5.

The control unit 120 controls the flow stream of the transmission oil by selectively communicating between the first inflow hole 112 and the second inflow hole 113 or the bypass hole 114 by selectively closing the connecting hole 115.

The control unit 120 includes a sliding member 121, an end cap 127, a fixing rod 135, a deformable member 137, and a first elastic member 141.

The sliding member 121 has one end opened, and a mounting part 122 protruding toward an upper side is formed at a center portion of the control unit 120.

At least one first opening hole 123 is formed on one side of the sliding member 121 corresponding to the first inflow hole 112 and the bypass hole 114 in a length direction.

Furthermore, the sliding member 121 includes at least one second opening hole 125 on another side corresponding to the second inflow hole 113 and the inflow port P1 longitudinally.

The sliding member 121 is disposed inside the mounting space (S) of the valve housing 110 in a slidable manner.

The sliding member 121 may have a cylindrical shape in which one end facing upward is open, and another end except the mounting part 122 is closed.

Here, each of the first opening hole 123 and the second opening hole 125 may be formed at an upper and lower side of the sliding member 121 to be spaced apart from each other. The upper side first opening hole 123 may be bigger than the upper side second opening hole 125.

In the present disclosure, the end cap 127 is connected to a mounting hole H of the valve housing 111, and a fixing groove 129 is formed at the center of the end cap 127.

The end cap 127 seals the mounting space S of the valve house 111 except the first and second inflow holes 112 and 113, the bypass hole 114, and the connecting hole 115 at the mounting hole H to prevent the transmission oil from leaking from the mounting hole H.

The end cap 127 may be fixed to the valve housing 110 through a mounting ring 131 which is fixedly mounted to an interior circumferential surface of the open end of the valve housing 111.

The mounting ring 131 may be fixedly mounted through a ring groove 118 formed along the periphery of the interior circumferential surface of the open end of the valve housing 111.

That is, one end of the end cap 127 is supported through the mounting ring 131 mounted in the ring groove 118 while the one end of the end cap 127 is inserted into the mounting hole H of the valve housing 110, and thus, the end cap 127 is fixedly mounted to the valve housing 111.

The oil cooler 100 according to the present disclosure further includes a seal ring 133, which prevents the transmission oil flowing into the valve housing 110 from leaking to outside the valve housing 110, mounted between the inflow of the valve housing 110 and the end cap 127.

That is, the seal ring 133 seals between an exterior circumferential surface of the end cap 127 and the mounting hole H to prevent the transmission oil from leaking to the outside.

In the present disclosure, the fixing rod 135 has a circular rod shape and is fixed to the fixing groove 129 of the end cap 127.

The deformable member 137 is inserted into the mounting part 122 of the sliding member 121, and a bottom portion of the deformable member 137 is inserted to one end of the fixing rod 135.

Expansion or contraction is performed thereinside through such a deformable member 137 depending on a temperature change of the transmission oil, and the position thereof varies up and down motion of the fixing rod 135 to selectively move the sliding member 121 forward and backward.

The sliding member 121 can be fixed to the deformable member 137 through a fixing ring 139 mounted between the mounting part 122 and the deformable member 137 below the deformable member 137 inserted to the mounting part 122.

In the present disclosure, the deformable member 137 may include a wax material on which contraction and expansion are performed depending on the temperature of the transmission oil.

The wax material is a material of which volume expands or contracts depending on the temperature, that is, its volume expands when the temperature increases, and its volume contracts when the temperature decreases and it returns to its initial volume.

The deformable member 137 includes the wax material inside, and when the volume deformation of the wax material occurs due to temperature change, the deformable member 137 moves forward or backward on the fixing rod 135, while an external form thereof does not deform.

When the transmission oil more than the predetermined temperature flows to the deformable member 137 through the first inflow port 111, as the volume thereof expands, the deformable member 137 moves the sliding member 121 forward, while rising on the fixing rod 135 from an initial position mounted on the fixing rod 135.

When the transmission oil less than the predetermined temperature flows in a state of expansion of volume, since the volume contracts, the deformable member 137 moves backward on the fixing rod 135 and returns the sliding member 121 to the initial position.

When the transmission oil less than the predetermined temperature flows to the deformable member 137 in the initial state of being mounted to the fixing rod 135, the position does not vary since the expansion or contraction does not occur.

The first elastic member 141 is interposed between the sliding member 121 inside the valve housing 111, and when ascending or descending depending on the expansion or contraction of the deformable member 137, the first elastic member 141 is compressed or pulled to provide elastic force to the sliding member 121.

The first elastic member 141 may be a coil spring having one end supported on an inner side of the closed one end of the valve housing 111, and another supported on the inner side of the other end of the sliding member 121.

Furthermore, the valve housing 111 has a support groove 119 to which the first elastic member 141 is fixed in a supported state at the one of the valve housing 111, and the one end of the first elastic member 141 is stably supported through the support groove 119.

The operation of the bypass valve 110 will be described below with reference to FIGS. 6A and 6B.

Figure 6A:
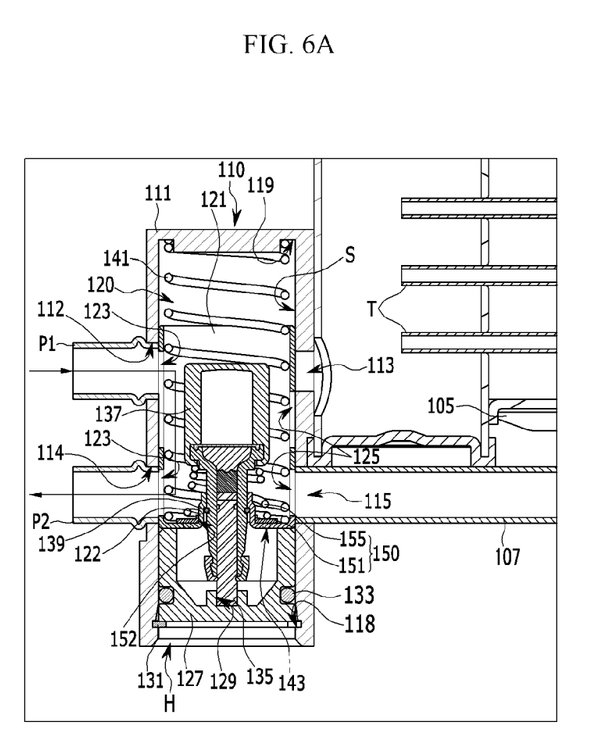
FIGS. 6A and 6B are diagrams of a step-by-step operation state of a bypass valve of the oil cooler for a vehicle according to an exemplary embodiment of the present inventive concept.
Figure 6B:
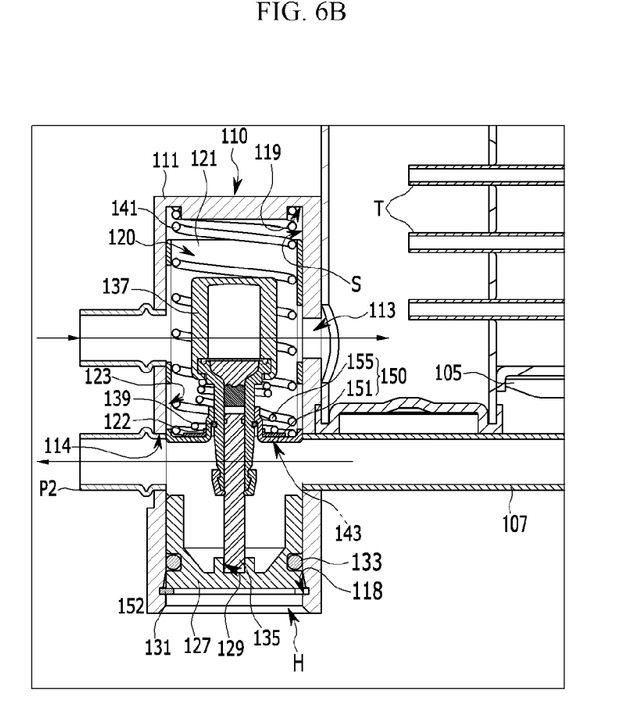

FIGS. 6A and 6B are diagrams of a step-by-step operation state of the bypass valve of an oil cooler for a vehicle according to an exemplary embodiment of the present inventive concept.

Referring to FIG. 6A, when the transmission oil flowing through the inflow port P1 is below the predetermined temperature, since the deformable member 137 does not deform, the sliding member 121 maintains the initial mounting state.

Here, the first opening hole 123 of the sliding member 121 is located in the first inflow hole 112 and the bypass hole 114, thereby opening the first inflow hole 112 and the bypass hole 114.

In the second opening holes 125, the second opening hole 125 located at the top keeps the closed state of the second inflow hole 113 in the state of being located below the second inflow hole 113, and the second opening hole 125 located at the bottom is located at the connecting hole 115 to keep the outflow pipe 107 in an opened state.

Accordingly, the transmission oil flowing into the first inflow hole 112 from the transmission 5 flows into the transmission 5 again through the bypass hole 114, as the second inflow hole 113 maintains the closed state.

The bypass valve 110 is able to rapidly warm up the transmission 5 by allowing the transmission oil below the predetermined temperature from the transmission 5 to bypass to the transmission 5 again through the bypass hole 114, without cooling through the inflow tank 101 when the transmission oil is below the predetermined temperature.

The transmission oil is cooled in the outflow tank 103 and flows in through the opened connecting hole 115, but since the transmission oil does not flow into the inflow tank 101 through the closed second inflow hole 113, only a small amount of transmission oil flows through the second inflow hole 113 and flows into the transmission 5, together with the transmission oil bypassing through the bypass hole 114.

That is, the small amount of cooled transmission oil flowed through the connecting hole 115 does not affect the temperature of the transmission oil bypassing, and as the non-cooled transmission oil continuously bypasses and flows into the transmission 5, the warming of the transmission 5 can be more rapidly performed.

Thus, with the oil cooler 100 according to an exemplary embodiment of the present inventive concept, since the transmission 5 can be more rapidly warmed through the above-described operation of the bypass valve 110, it is possible to improve the overall fuel efficiency of the vehicle by reducing the friction loss inside the transmission 5.

On the other hand, referring to FIG. 6B, the sliding member 121 moves forward (upwards in the drawings) in the mounting space (S) of the valve housing 111 as the deformable member 137 expands and deforms when the temperature of the transmission oil flowed through the first inflow hole 112 is the same as or higher than the predetermined temperature.

The sliding member 121 moves forwards inside the valve housing 111 such that the bypass hole 114 and the connecting hole 115 are maintained in the opened state.

The first and second opening holes 123 and 125 located at the top are located in the first inflow hole 112 and the second inflow hole 113, respectively, thereby the first and second inflow holes 112 and 113 are maintained in the opened state.

The transmission oil which flows into the first inflow hole 112 through the inflow port P1 and having the temperature that is the same as or higher than the predetermined temperature flows into the inflow tank 101 through the second inflow hole 113.

The transmission oil flowed into the inflow tank 101 flows into the outflow tank 103 through each of the tubes (T) so as to be cooled by heat exchanging with outside air.

The cooled transmission oil is discharged through the discharge hole 104 of the outflow tank 103. Thereafter, the transmission oil flowed out from the outflow tank 103 flows from the outflow pipe 107 into the valve housing 101 through the connecting hole 115 and then flows from the valve housing 101 into the transmission 5 through the bypass hole 114.

Accordingly, the transmission oil cooled in the oil cooler 100 flows into the transmission 5 that is overheated due to the temperature rise of the transmission oil to cool the transmission 5.

When the sliding member 121 forwarded by the deformable member 137 moving along the fixing rod 135, the first elastic member 141 is in a state of being compressed between the valve housing 110 and the sliding member 121.

When the temperature of the transmission oil flowed through the first inflow hole 112 falls below the predetermined temperature, the deformable member 137 moves the fixing rod 135 backwards, while contracting to the initial state from the expansion state.

The sliding member 121 more rapidly descends to the initial position by the elastic force of the first elastic member 141 in the compressed state, as in FIG. 6B as the initial mounting state, thereby closing the opened second inflow hole 113.

The oil cooler 100 may be controlled with the flow stream of the transmission oil through the above-described operation of the bypass valve 110 according to the temperature of the inflow transmission oil introduced from the transmission 5.

In the present disclosure, the sliding member 121 has at least one relief hole 143 spaced apart from the mounting part 122.

The at least one relief hole 143 may be spaced apart from each other at a predetermined angle in a circumferential direction around the mounting part 122. In the present disclosure, four relief holes 143 are spaced apart from each other around the mounting part 122 at an angle of 90°.

In the present disclosure, the four relief holes 143 spaced from each other in the circumferential direction around the mounting part 122 at the angle of 90° are described as an exemplary embodiment, but the present disclosure is not limited thereto, and the size, the number, and the positions of the relief holes 143 can be modified and applied.

In the present disclosure, a pressure control unit 150 may be provided between the sliding member 121 and the deformable member 137. The pressure control unit 150 selectively opens and closes the relief hole 143 to control an internal pressure of the valve housing 111, when differential pressure occurs by the cooled transmission oil flowed from the oil cooler 9 inside the valve housing 111.

The pressure control unit 150 includes an opening and closing member 151 that is disposed inside the other end of the sliding member 121 to ascend and descend in accordance with the relief hole 143. A second elastic member 155 is disposed between the opening and closing member 151 and the deformable member 137 inside the sliding member 121 and supplies the elastic force to the opening and closing member 151.

The opening and closing member 151 has a disk shape with a penetration hole 152 at a center to correspond to the mounting part 122, and may be mounted to the inside of the other end of the sliding member 121 in the state of being inserted into the mounting part 122 through the penetration hole 152.

Furthermore, the opening and closing member 151 may include a protrusion 153 that protrudes toward the second elastic member 155 from the interior circumferential surface of the penetration hole 152.

Such a protrusion 153 guides the opening and closing member 151 so as to stably ascend and descend along the mounting part 122, when the differential pressure occurs depending on a flow rate of the transmission oil flowed from the oil cooler 9 in the valve housing 110 or the generated differential pressure is released and the opening and closing member 151 ascends or descends.

The second elastic member 155 may be a coil spring having one end supported by the deformable member 137 and another end supported by the opening and closing member 151.

Hereinafter, the operation of the pressure control unit 150 will be described with reference to FIGS. 7A and 7B.

Figure 7A:
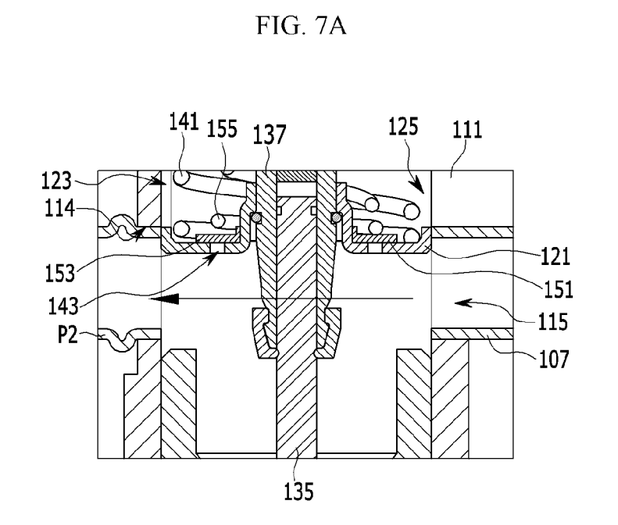
FIGS. 7A and 7B are diagrams of a step-by-step operation state of a pressure control unit applied to a bypass valve of an oil cooler for a vehicle according to an exemplary embodiment of the present inventive concept.
Figure 7B:
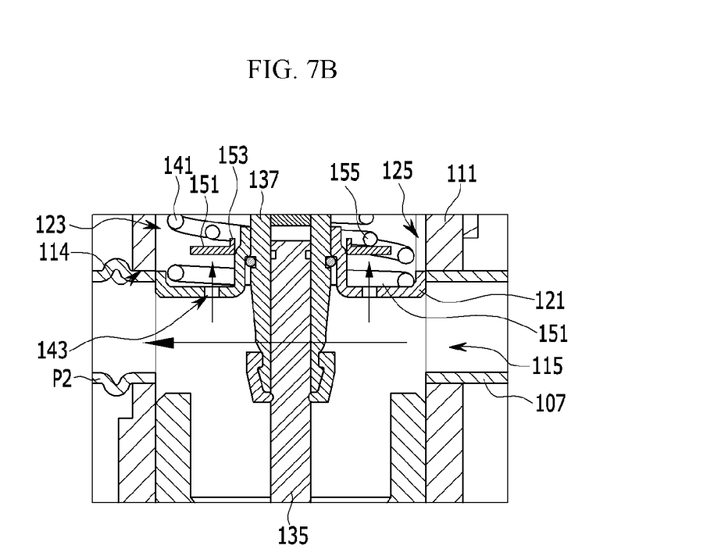

FIGS. 7A and 7B are diagrams of a step-by-step operation state of the pressure control unit that is applied to the valve for a vehicle according to an exemplary embodiment of the present invention.

Referring to FIGS. 7A and 7B, the pressure control unit 150 selectively operates while the bypass hole 114 and the connecting hole 115 are open, as the sliding member 121 moves forward (upwards in the drawings) due to expansion deformation of the deformable member 137.

When the amount of the cooled transmission oil flowed from the outflow tank 103 into the valve housing 111 via the connecting hole 115 and the outflow pipe 107 is relatively low, the pressure difference is not generated between the upper part and the lower part with respect to the bottom of the sliding member 121 in the valve housing 111.

Referring to FIG. 7A, the pressure control unit 150 maintains the initial mounting state in which the relief hole 143 is closed.

When the amount of the cooled transmission oil flowed into the valve housing 111 through the connecting hole 115 increases, the pressure difference is generated between upper part and lower part with respect to the bottom of the sliding member 121 in the valve housing 111.

Referring to FIG. 7B, the opening and closing member 151 ascends by the pressure of the transmission oil due to the generated differential pressure to open the relief holes 143.

Then, some of the cooled transmission oil flowed through the connecting hole 115 flows into the sliding member 121 through the open relief hole 143, thereby eliminating the pressure difference inside the valve housing 111 that is located inside the sliding member 121 and below the sliding member 121.

Furthermore, when the differential pressure inside the valve housing 111 is eliminated, the opening and closing member 151 of the pressure control unit 150 rapidly descends by the elastic force of the second elastic member 155 that is compressed when the opening and closing member 151 ascends and returned to the initial mounting state, thereby closing the relief holes 143 as shown in FIG. 7A.

That is, through the above-described operation, the bypass valve 110 may eliminate the pressure difference caused by the difference in flow rate of the transmission oil flowing into the valve housing 111 from the transmission 5 and the outflow tank 103, by the operation of the relief hole 143 and the pressure control unit 150.

Furthermore, if the valve housing 111 eliminates the pressure difference caused by the difference inside, it may be possible to improve the overall pressure resistance and durability of the bypass valve 110 and to improve reliability and responsiveness of the valve operation.

The oil cooler 100 for a vehicle according to the present disclosure has the bypass valve 110 which is operated according to the temperature of the transmission oil, thus improving spatial utility of an engine compartment.

Furthermore, by controlling the flow stream of the transmission oil to bypass or flow into the oil cooler 100, while rapidly expanding or contracting depending on the temperature of transmission oil through the bypass valve 110, and the oil cooler 100 having a simple structure, manufacturing and assembling efficiencies are improved and manufacturing cost is reduced through simplification of the constituent elements.

In addition, during bypass of the transmission oil, required power of a hydraulic pump can be reduced due to the increase of flow rate, by assembling the internal constituent elements to the valve housing 111 provided integrally with the inflow tank 101 later, and since the internal components can be replaced after breakdown, the maintenance costs are reduced and the convenience of replacement work is improved.

Further, the flow rate increases by securing the bypass flow passage compared to the related art, by preventing the transmission oil cooled by the oil cooler 100 from leaking to the transmission in advance via the bypass valve 110.

Reliability of the flow stream control according to the temperature of the transmission oil can be secured, and by reducing friction loss inside the transmission 5 through the rapid warming of the transmission oil, the overall fuel consumption efficiency of the vehicle is improved.

Although the working fluid is described as transmission oil introduced from a transmission 5 by way of example in describing the oil cooler 100 according to the present disclosure, the present disclosure is not limited thereto. That is, all of working fluid that need to be warmed or cooled through heat exchange may be used as the working fluid.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. An oil cooler for a vehicle comprising:
an inflow tank through which a working fluid flows in;
an outflow tank spaced apart from the inflow tank by a predetermined interval and having a discharge hole at one side which faces the inflow tank;
a plurality of tubes connecting the inflow tank with the outflow tank longitudinally such that the working fluid flows therethrough;
a bypass valve integrally mounted to an outer side of one end of the inflow tank and connected to an inner side of the inflow tank to allow the working fluid bypassing or flowing into the inflow tank by opening or closing the bypass valve, respectively, according to a temperature of the working fluid; and
an outflow pipe of which a first end is mounted to the discharge hole and a second end is mounted to the bypass valve to connect the outflow tank with the bypass valve to allow the working fluid contained inside the outflow tank to flow out through the bypass valve toward the inflow tank according to an operation of the bypass valve,
wherein the bypass valve comprises:
a valve housing integrally mounted at the outer side of the one end of the inflow tank and protruding from the one end of the inflow tank; and
a control unit disposed inside the valve housing and controlling the working fluid to flow into the inflow tank or to bypass the inflow tank by performing expansion or contraction according to the temperature of the working fluid,
the valve housing comprises:
a first inflow hole formed at one side of the valve housing away from the inflow tank to mount an inflow port to the one side of the valve housing;
a bypass hole formed in another side of the valve housing which is spaced apart from the first inflow hole to mount a bypass port thereto;
a second inflow hole facing the first inflow hole at one surface which contacts the inflow tank and communicates with the inner side of the inflow tank; and
a connecting hole spaced apart from the second inflow hole at a protruding part protruding from the one end of the inflow tank such that the second end of the outflow pipe is connected thereto, wherein the control unit comprises:
  a sliding member of which a first end is open and a mounting part is formed at a center of a second end, at least one first opening hole is formed on one side corresponding to the first inflow hole and the bypass hole in a length direction, and at least one second opening hole is formed on another side corresponding to the second inflow hole and the connecting hole in the length direction, and which is slidably inserted inside the valve housing;
  a fixing rod having one end fixed to the fixing groove; and
  a deformable member inserted into the sliding member and moving forwardly or backwardly on the fixing rod by extending or contracting, respectively, according to the temperature of the working fluid to move the sliding member selectively forward and backward,
  wherein when the deformable member deforms, the fixing rod ascends and maintains the bypass hole and the connection hole, and the first and second opening holes formed at an upper side of the sliding member communicate with the first and second inflow holes, respectively.

2. The oil cooler for a vehicle of claim 1, wherein the inflow tank and the outflow tank have the plurality of tubes therebetween, and the inflow tank and the outflow tank are fixed to a side plate which connects upper and lower ends of the inflow tank with upper and lower ends of the outflow tank in a state of being disposed apart from each other.

3. The oil cooler for a vehicle of claim 1, wherein the inflow tank has a length shorter than that of the outflow tank.

4. The oil cooler of claim 1, wherein the outflow pipe has a cylindrical shape and is connected to the bypass valve such that the second end thereof contacts the first end of the inflow tank.

5. The oil cooler of claim 1, wherein the working fluid is transmission oil introduced from a transmission.

6. The oil cooler of claim 1, wherein the valve housing has a mounting space in which the first and second inflow holes, the bypass hole, and the connecting hole communicate therewith.

7. The oil cooler of claim 1, wherein the control unit further comprises:
  an end cap having a fixing groove at a center of the end cap, the end cap fixed to a mounting hole of the valve housing to block the mounting hole; and
  a first elastic member interposed between the valve housing and the sliding member and compressed or pulled to provide elastic force when the sliding member moves.

8. The oil cooler of claim 7,
  wherein the at least one first opening hole and the at least one second opening hole are formed at the upper side and a lower side of the sliding member, respectively, and the first opening hole at the upper side of the sliding member has an area greater than that of the second opening hole at the upper side.

9. The oil cooler for vehicle of claim 7,
  wherein when the deformable member is at an initial position of the deformable member, the first opening hole at upper and lower sides of the sliding member communicates with the first inflow hole and the bypass hole, respectively, the second opening hole formed at the upper side is disposed below the second inflow hole, and the second opening hole positioned at the lower side communicates with the connecting hole.

10. The oil cooler for vehicle of claim 7,
  wherein the sliding member and the deformable member are fixedly connected through a fixing ring which is mounted between the mounting part and the deformable member below the deformable member.

11. The oil cooler for vehicle of claim 7, wherein the bypass valve further comprises a seal ring mounted between the valve housing and the end cap, the seal ring preventing the working fluid flowing into the valve housing from leaking out from the valve housing.

12. The oil cooler for vehicle of claim 7,
  wherein the end cap is fixed to the valve housing through a mounting ring that is fixedly mounted to an inner circumferential surface of mounting hole.

13. The oil cooler for vehicle of claim 12,
  wherein the mounting ring is fixedly mounted in a ring groove which is formed along the inner circumferential surface of the mounting hole.

14. The oil cooler for vehicle of claim 7,
  wherein the sliding member has at least one relief hole that is spaced apart from the mounting part at the second end in which the mounting part is formed and that is spaced apart from each other at a predetermined angle in a circumferential direction around the mounting part.

15. The oil cooler for vehicle of claim 14, wherein the bypass valve further comprises a pressure control disposed between the sliding member and the deformable member and selectively opening and closing the at least one relief hole when a differential pressure is generated by the working fluid flowing inside the valve housing.

16. The oil cooler for vehicle of claim 15, wherein the pressure control unit comprises:
  an opening and closing member that is disposed inside the second end of the sliding member to correspond to the at least one relief hole, and that has a disk shape having a penetration hole formed at a center of the opening and closing member to correspond to the mounting part; and
  a second elastic member that is interposed between the opening and closing member and the deformable member inside the sliding member, and applies elastic force to the opening and closing member.

17. The oil cooler for vehicle of claim 16,
  wherein the opening and closing member includes a protrusion protruding toward the second elastic member from an inner circumferential surface of the penetration hole.

* * * * *